United States Patent
Piirainen et al.

(10) Patent No.: US 6,816,558 B2
(45) Date of Patent: Nov. 9, 2004

(54) CHANNEL IMPULSE RESPONSE ESTIMATION USING RECEIVED SIGNAL VARIANCE

(75) Inventors: Olli Piirainen, Oulu (FI); Aki Happonen, Kiiminki (FI)

(73) Assignee: Nokia Corporation, Espoo (FI)

( * ) Notice: Subject to any disclaimer, the term of this patent is extended or adjusted under 35 U.S.C. 154(b) by 148 days.

(21) Appl. No.: 09/765,492

(22) Filed: Jan. 18, 2001

(65) Prior Publication Data

US 2003/0007571 A1 Jan. 9, 2003

Related U.S. Application Data

(63) Continuation of application No. PCT/EP98/04562, filed on Jul. 21, 1998.

(51) Int. Cl.[7] .......................... H03K 9/00; H04L 27/06; H04L 27/14; H04L 27/22
(52) U.S. Cl. ....................................... 375/316; 375/231
(58) Field of Search ................................. 375/316, 229, 375/231

(56) References Cited

U.S. PATENT DOCUMENTS

| | | | |
|---|---|---|---|
| 5,231,648 A | | 7/1993 | Driedger et al. |
| 5,251,233 A | | 10/1993 | Labedz et al. |
| 5,329,547 A | | 7/1994 | Ling |
| 5,581,580 A | | 12/1996 | Lindbom et al. |
| 5,615,208 A | * | 3/1997 | Hagmanns ................... 370/252 |
| 6,408,189 B1 | * | 6/2002 | Nakamura et al. ........... 455/504 |

FOREIGN PATENT DOCUMENTS

| | | |
|---|---|---|
| EP | 0701334 A2 | 3/1996 |
| WO | WO 94/28661 | 12/1994 |
| WO | WO 97/23089 | 6/1997 |
| WO | WO 97/44916 | 11/1997 |

OTHER PUBLICATIONS

Adative Minimum Variance Methods fdor Direct Blind Multi–channel Equalization; Xu and Tsatsanis; IEEE 1998 0–7803–4428–Jun. 1998; p. 2105–2108.*
Perreau et al , "On–Line Blind Equalization of Fir Channels Using a Gibbsian Technique", *IEEE*, 1997, XP–002094908.
Chen et al, "Concatenated soft–output equalization and TCM for wireless personal communications" *IEEE*, 1997. XP–000737786.
"Joint Data and Kalman Estimation of Fading Channel Using a Generalized Viterbi Algorithm", *Omide et al, IEEE*, 1996, XP–000625959.
Bossert et al, "Channel Estimation and Equalization in Orthogonal Frequency Division Multiplexing Systems", *Mobile Kommunikation, Vortrage Der Itg–Fachtagung, Neu–ulm*, 1995, XP–000749227.
Kaleh et al, "Joint Parameter Estimation and Symbol Detection for Linear or Nonlinear Unknown Channels", *IEEE*, 1994, XP–002094909.
Yoshihiko Akaiwa, "Introduction to Digital Mobile Communication," *Wiley Series in Telecommunications and Signal Processing*, p. 83–89 and 285–286.

\* cited by examiner

*Primary Examiner*—Stephen Chin
*Assistant Examiner*—Harry Vartanian
(74) *Attorney, Agent, or Firm*—Squire, Sanders & Dempsey L.L.P.

(57) ABSTRACT

The present invention proposes a device (1) for processing received signals transmitted via a transmission channel (4), said device comprising obtaining means (2a) adapted to obtain an estimated response function (h+e) of said transmission channel (4), based on said received signals (y); deriving means (2b) adapted to derive and estimated variance ($\delta^2$) of said received signals (y); and modifying means (2c) adapted to modify said estimated response function (h+e) by applying said estimated variance ($\delta^2$) to said estimated response function (h+e), thereby obtaining a modified impulse response (h). The present invention also proposes a corresponding method.

11 Claims, 1 Drawing Sheet

CHANNEL IMPULSE RESPONSE ESTIMATION USING RECEIVED SIGNAL VARIANCE

This application is a continuation of international application serial number PCT/EP98/04562, filed 21 Jul. 1998.

FIELD OF THE INVENTION

The present invention relates to a method for processing received signals transmitted via a transmission channel and also relates to a corresponding device. In particular, the present invention is directed to a method and corresponding device for channel impulse response improvements in TDMA systems.

BACKGROUND OF THE INVENTION

Recently, mobile radio telecommunication systems have widely spread. Such mobile radio telecommunication system operate for example according to a commonly agreed standard, like for example the GSM standard. According to GSM standard, data transmission is performed according to a method of time divisional multiple access (TDMA). The TDMA transmission principle specifies that data are transmitted from a transmitter to a receiver and vice versa only during respectively specified time slots of frames.

Data transmission in such telecommunication systems substantially relies on digital data transmission. However, between a mobile radio transceiver device as a subscriber terminal (hereinafter: mobile station MS) and a stationary radio transceiver device as a serving radio network element (hereinafter: base station BS) data have necessarily to be transmitted as analogue data via the air interface Um.

Consequently, data transmitted by the mobile station MS are received via a base station antenna means of a reception device of the base station BS as analogue data. In the course of the further processing of the thus received data by the reception device, the analogue data are analog to digital converted, i.e. passed through an A/D converter means. At the next stage of the processing, the obtained digital data are supplied to an equalizer means for being equalized. The thus obtained output data are then supplied to a channel codec means for coding/decoding the data. At the reception side, decoding is performed to separate received speech data from associated signaling data.

Particular attention in the course of this processing has to be paid to the equalizing of the received data, since the equalizing is required to reconstruct, at the reception side, the transmitted signal from a mixture of received signals.

For example, assuming a situation in a radio telecommunication network with a base station BS and only a single mobile station MS present in the radio coverage area of the base station. Then, a signal s transmitted from the mobile station MS may reach the base station BS directly via line of sight at a time s(t). However, the same signal s may be deflected by, e.g., a building, a mountain or the like present in the environment. Thus, the same signal may reach the base station BS at a later point of time s(t+T), and is thus superposed to the signal s(t). Due to the delay T, both received signals are no longer in phase with each other. Moreover, the delayed signal s(t+T) may even be more attenuated than the signal s(t) due to the longer transmission path. Thus, the signal received by the base station BS is distorted and originating from the mobile station MS is distorted. Now, assuming that another mobile station MS' is additionally present, then signals s'(t'), s'(t'+T') are additionally received by the base station BS, which may lead to interference between the respective transmitted data symbols (intersymbol interference).

Therefore, an equalizer means has to reconstruct (detect) the initially transmitted signal s(t) and/or s'(t') from the received mixture of signals s(t), s(t+T), s'(t'), s'(t'+T').

The thus reconstructed (or detected) signal is required to be as similar to the originally transmitted signal as possible. This reconstruction is therefore a main concern when designing equalizers, e.g. for use in a reception device of a base station BS.

Hitherto, in equalizers of reception devices used in mobile telecommunication systems, the channel impulse response (CIR) is estimated, and the thus estimated channel impulse response is used to detect, i.e. to reconstruct the transmitted data symbols.

Document WO 94 28661 representing the prior art described in the preambles of claims 1 and 7 discloses a method for estimating a channel state based on a low complexity model. This method is used by a received in Rayleigh fading environments, and the receiver contains at least one channel stated estimator which uses an auto regressive model for channel variations.

Document U.S. Pat. No. 5,329,547 discloses a method and an apparatus for coherent communication. According to this method, reference symbols are inserted into a data stream. The channel response is estimated by utilizing the stream of reference samples. An estimated data symbol is detected from the stream of data samples by utilizing the estimated channel response.

Document WO 97 23089 discloses a method and apparatus for channel identification utilizing two Least-Squares (LS) estimators. Each LS estimator is used for calculating a sequence of channel values, and further for determining and estimated channel impulse response, over an entire frequency band thereof.

The estimated channel impulse response is usually based on the received samples of the stream of data symbols. Therefore, it is an estimate of the actual (observed) channel impulse response. However, an error in the channel impulse response leads to a degraded performance when detecting/reconstructing transmitted data symbols from received data symbols.

In a previous solution, the above described estimated channel impulse response is assumed to be ideal, thereby disregarding errors, and it is used as it is for data symbol reconstruction. However, this solution was unsatisfactory due to the error in the observed channel impulse response being not taken into account.

Another known solution for improving the performance of an equalizer is disclosed in document U.S. Pat. No. 5,251,233 by Labedz et. al., assigned to Motorola Inc. The basic idea described therein is to estimate the energy of taps in the impulse response. Those taps having an energy below a predetermined threshold level are zeroed in order to reduce noise in the estimated channel impulse response. This previously proposed method may be applied to complex taps or real taps, i.e. may be performed separately for real and imaginary taps. The method disclosed in the Labedz patent improves (i.e. reduces) the bit error rate BER in the reproduced detected signal (which is an indication for the quality of a receiver) in situations where the channel interference ratio C/I or C/(I+N), respectively, with N being a noise signal superposed to an interfering signal, is low and the channel has a poor quality. The method is also beneficial in channels having a short impulse response. (The term taps refers to coefficients of each respective delay element of the corresponding FIR model for the used circuitry. Thus, based on the tap values, poles and zeroes of the transmission function may be calculated.)

However, under good channel conditions, the method as proposed by Labedz et. al. even degrades the receiver performance which may be attributable to the zeroing of amplitude coefficients of certain taps.

SUMMARY OF THE INVENTION

Consequently, it is an object of the present invention to provide a method for processing received signals transmitted via a transmission channel, and to provide a corresponding device which improve the receiver performance in all channels irrespective of actual channel conditions.

According to the present invention, this object is achieved by a method for processing received signals transmitted via a transmission channel, the method comprising the step of obtaining an observed response function of said transmission channel, based on said received signals; characterized by the steps of deriving an estimated variance of said received signals; and modifying said observed response function by applying said estimated variance to said observed response function, thereby obtaining a modified impulse response; wherein said step of modifying is effected by multiplying said estimated response function with a vector, the components of which being determined on the basis of parameters of the estimated response function and said estimated variance.

Furthermore, the present invention proposes a device for processing received signals transmitted via a transmission channel, said device comprising obtaining means adapted to obtain an observed response function of said transmission channel, based on said received signals; characterized by deriving means adapted to derive an estimated variance of said received signals; and modifying means adapted to modify said observed response function by applying said estimated variance to said observed response function, thereby obtaining a modified impulse response; said modifying means further comprises a multiplying means adapted to multiply said estimated response function with a vector, the components of which being determined on the basis of parameters of the estimated response function of said estimated variance.

Advantageous further developments of the present invention are as set out in the respective dependent claims.

According to the present invention, the proposed method and/or device are very easy to implement. Moreover, the present invention improves the receiver performance in all channel types as specified in the GSM 5.05 recommendation (e.g. channel models "HT100" and "RA250"). Additionally, the improvement may be achieved not only independent of the channel type as such, but also independent of the specific channel condition, i.e. in situations of different channel interference ratios.

Preferred embodiments of the present invention are described herein below in detail by way of example with reference to the accompanying drawings.

DESCRIPTION OF PREFERRED EMBODIMENT

Figure 1:
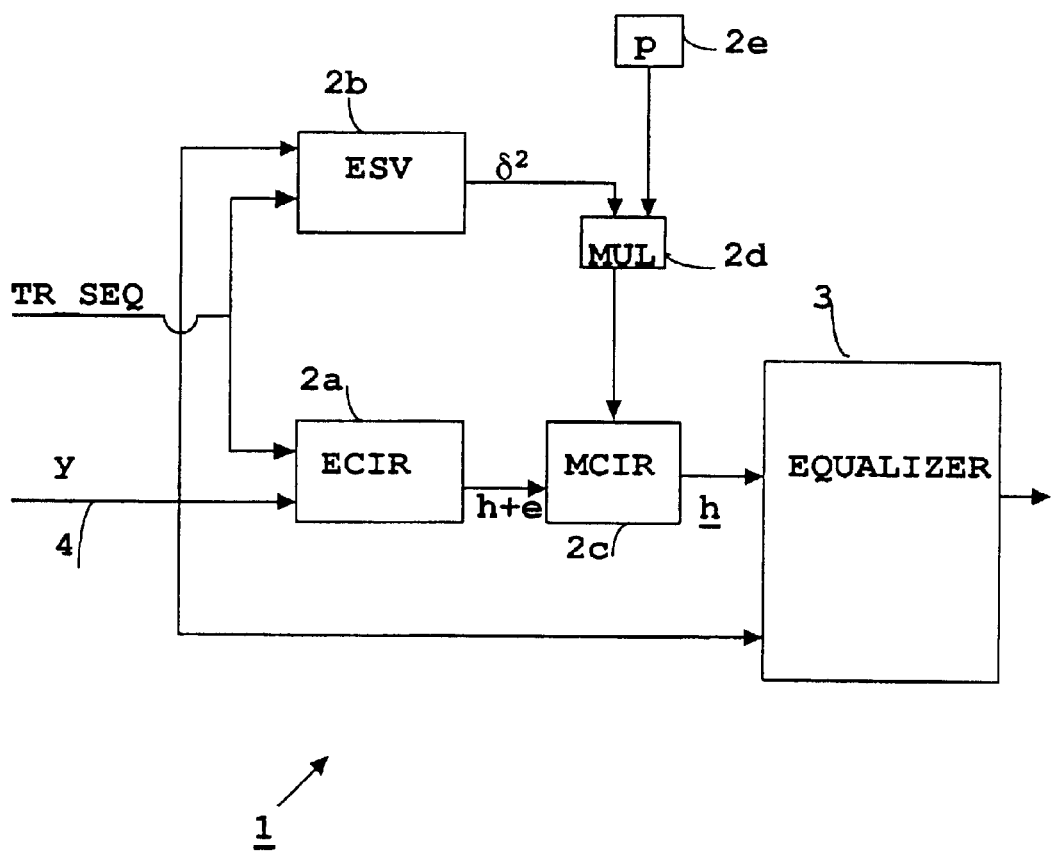
FIG. 1 is a schematic block diagram of a device according to the present invention.

According to the present invention, an (obtained) estimated channel impulse response (CIR) which is based on received data symbols, is modified, prior to use for equalizing the transmitted received signal consisting of the stream of data symbols, in such a way so as to reflect the error inherent to the transmission channel (e.g. caused by adverse external influences on the radio channel or the like).

Stated in other words, instead of the recently adopted more or less intuitive methods (neglecting transmission channel errors) the proposed method is based on an analytical approach, as set out in detail below.

It is commonly known that in mobile telecommunication systems equalizer means are based on the principle of maximum-likelihood sequence estimation (MLSE). In such equalizing means, the Viterbi algorithm is implemented in order to obtain an optimum equalizer performance. This is for example described in "Introduction To Digital Mobile Communication" by Y. Akaiwa, p. 83–89 and p. 285–286, John Wiley & Sons, New York, USA, 1997.

As commonly known, the MLSE, i.e. the estimated sequence of the maximum-likelihood, can be found upon minimizing the objective function (also referred to as "metric") J as a result of the implemented algorithm being carried out. (Conventionally, the Viterbi algorithm may be used for such a purpose.)

$$J_{min} = (y - X\underline{h})^H (y - X\underline{h}) \qquad (1)$$

with $\underline{h}$ being the estimated channel impulse response based on the received signal sequence in vector representation for use in equalization;

X being the symbol sequence matrix;

y being the received data symbol stream in vector representation, and the operator "H" attributed to the first term indicates that the resulting vector represents the complex conjugate transposition.

The symbol sequence matrix X is defined according to a known training sequence. The training sequence is known beforehand to the system and is also transmitted as a part of the data transmitted during a time slot TS of a TDMA frame as a so-called data burst.

For example, assuming a symbol sequence matrix using the training sequence (in vector representation) trs. The vector trs is a row vector containing several symbol values. In this connection, it is to be noted that for example according to GSM, when using GMSK (Gaussian Minimum Shift Keying) modulation, the vector elements may assume values of +1 and −1 (not 1 and 0). The matrix can be formed in the following way:

$$x = \begin{pmatrix} trs(tl-1) & \ldots & trs(tl-hl) \\ trs(tl-2) & \ldots & trs(tl-hl-1) \\ \ldots & \ldots & \ldots \\ trs(hl-1) & \ldots & trs(0) \end{pmatrix} \qquad (1a)$$

with tl representing the length of the used part of the training sequence, and hl representing the length of the impulse response.

Thus, the multiplication of matrix X with vector h performs a convolutional operation for the training sequence. In the above chosen representation of the equation, the latest data sample is the first element in the vector y. (However, other notations of the equations are conceivable).

Although herein above it has been mentioned that conventionally the Viterbi algorithm is used for minimizing the metric, this is not required in the present case. Namely, the metric "J" as defined in connection with the present invention is related to the part of the received sequence, i.e. stream of data samples, where the known training sequence is located. Thus, the algorithm is not performed on the entire data of the burst but only on a known part of the burst. This is beneficial in reducing the processing time for obtaining the improved channel impulse response. Moreover, due to the same fact, there is no need for any feedback loops from the output of the equalizer to the input of an accordingly operated device for channel impulse response estimation, as it is conventionally required for implementing the Viterbi algorithm, since the data (training sequence) is already known without the equlizer. This is beneficial in terms of a simplified hardware structure of the arrangement according to the present invention.

Now, the estimate of the channel impulse response $\underline{h}$ includes the real (actual) channel impulse response h (of the channel as such) and the error vector e attributed to the channel.

Thus, $\underline{h}$ may be expressed (in vector notation) as:

$$\underline{h}=h+e \tag{2}$$

The analytical problem resides now in a determination of a vector a, which, when multiplied with the observed (detected) estimated channel impulse response (h+e), minimizes the expected value of the metric $J_{min}$. It is to be noted that since the metric "J" is related to the part of the data stream where the well known training sequence occurs, Viterbi algorithm is not required to optimize this metric in respect with the vector a.

Hence, the modified estimated channel impulse response $\underline{h}$ is to be rewritten to read:

$$\underline{h} = \begin{pmatrix} a_0[h_0 + e_0] \\ a_1[h_1 + e_1] \\ \ldots \\ a_i[h_i + e_i] \\ \ldots \\ a_{(n-1)}[h_{(n-1)} + e_{(n-1)}] \\ a_n[h_n + e_n] \end{pmatrix} \tag{3}$$

The error vector power $|e|^2$, in turn, is dependent on and can thus be calculatively derived from the estimated signal variance $\delta^2$ of the received sequence of signals using known impulse response estimation methods. An example for such known impulse response estimation methods may be found in the patent application EP-A-0 701 334, filed in the name of NOKIA Mobile Phones.

Assuming white noise occurring as the error, a normal optimization for the coefficients $a_i$ of the vector a to be found yields:

$$a_i=|h_i|^2/[|h_i|^2+e^*_i e_i] \tag{4}$$

for 0<=i<=n of the vector components, with $e^*_i$ denoting the conjugate complex value of the coefficient $e_i$, and $e^*_i e_i$ representing the quantity of an error vector component power $|e_i|^2$. This result is obtained when the values a*(h+e) [equation 3] are inserted into the metric J in place of each element h, and the optimization is effected in terms of the elements of vector a.

Furthermore, the term $e^*_i e_i$ is also dependent on the variance $\delta^2$ of the received signal by a constant p which, as explained herein below, can easily be analyzed. The variable e is the error vector related to each impulse response taps because the impulse response must be estimated as it is not exactly known. Therefore, e represents the difference between the actual impulse response and the estimated impulse response. Although e as such can not be known, the value $|e_i|^2$ can be estimated on the basis of the variance $\delta^2$ and the constant p, and it represents the variance of the impulse response taps.

Then, considering the above, equation (4) may be rewritten to read:

$$a_i=|h_i|^2/[|h_i|^2+p\delta^2] \tag{5}$$

with p being the user selectable constant, and $\delta^2$ being the estimated variance of the received signal.

The value of the constant p is to be set by a user. Most of all the parameter p is set dependent on the properties of the used training sequence like the length, orthogonality thereof, etc. Alternatively or additionally, the value p may be dependent on the used modulation method for the transmitted data.

As the $\delta^2$ is related to the variance of the received signal, $p*\delta^2$ should be proportional to $|e_i|^2$, so this represents the variance of the of estimated impulse response coefficients.

As mentioned above, a case of Gaussian noise has been assumed, and under this assumption, the variance of the impulse response coefficients is reliably deemed to be proportional to the variance of the received data samples by the parameter p.

Equations (4) and (5) discussed above mention a variable $|h_i|^2$ of the actual channel impulse response. However, the exact values thereof can not be known. Therefore, from a practical point of view those (numerical) estimates obtained from the estimated impulse response, i.e. based on the values of (h+e) can be used, while an acceptable accuracy is still obtainable.

The above described method for deriving the parameters $a_i$ of the vector a can be performed for the complex taps, Alternatively, this may be done separately for real and imaginary parts of the coefficients, which however, results in the number of coefficients $a_i$ being doubled.

Apparently, according to the above described method as proposed by the present invention, the (observed) estimated channel impulse response (h+e) is first modified by taking into account the error e of the channel and after that, the modified channel impulse response $\underline{h}$ is used for equalization of the received signals to reconstruct the originally transmitted signal.

The present invention may easily be applied to a device 1 for processing received signals y transmitted via a transmission channel 4. An example thereof is described hereinafter with reference to FIG. 1.

A stream of data signals y is supplied via a transmission channel 4.

The data signals are input to an obtaining means 2a which is adapted to obtain/detect an estimated channel impulse response (h+e) of said transmission channel 4, based on said received signals y and a known training sequence TR_SEQ supplied from a memory means (not shown) of the receiver device and also occurring in the data stream y.

The thus estimated channel impulse response represents the channel transfer function h as such and also takes account of an error e occurring upon transmission.

Furthermore, the data y are directly input into an equalizer means 3 for being equalized, to thereby reconstruct the initially transmitted signal.

The data signals y are also supplied to a deriving means 2b, which is adapted to derive (or estimate) an estimated variance $\delta^2$ of said received signals y, thereby being representative of the error inherent to the transmission channel 4. The training sequence TR_SEQ is also supplied to the deriving means 2b to serve as a basis for deriving the estimated variance.

As described herein above, the thus obtained variance $\delta^2$ is weighted by multiplication with a predetermined constant p. The weighting is effected in a weighting means 2d. The constant p is dependent on, for example, the properties of the training sequence and/or the modulation method and is set by an operator of the system (base station system) using a setting means 2e.

The obtained (detected) channel impulse response h+e is combined with the weighted variance $p*\delta^2$ in a modifying means $2c$, which is adapted to modify said estimated response function h+e by applying said estimated variance $\delta^2$ after being weighted to said estimated response function h+e. As a result of the modification, a modified impulse response $\underline{h}$ is obtained. The modified impulse response is supplied to the equalizer means 3 as a control signal for the equalization. The thus controlled equalizer 3 outputs a reconstructed initially transmitted signal of high quality.

Thus, as can be seen in FIG. 1, in the device according to the present invention, the actually detected channel impulse response h+e is estimated from the detected data y, and also the variance $\delta^2$ of the received data y is estimated. This is done for a part of a transmitted burst containing the training sequence, which is known beforehand and also used as a basis in both estimations. The estimated variance and the actually detected estimated channel impulse response are then used to modify the detected channel impulse response, to obtain a modified channel impulse response which is then used for controlling the equalizer means 3 in order to improve the data symbol estimation, i.e. reconstruction of initially transmitted signals from the received signals.

A benefit of the above described invention resides in that the obtained bit error rate BER of the reconstructed signal versus the channel interference ratio (C/I, or C/(I+N)) is remarkably improved. Such improvement is even achieved for each of a plurality of respective channel types as specified in GSM 5.05 recommendation. Thus, independent of the channel interference ratio, an improvement of the bit error rate of nearly a factor of two could be observed in studies of the present inventors. That is, using the present invention, the bit error rate could be reduced by almost 50% as compared to the case without the present invention being implemented.

It should be understood that the above description and accompanying figures are only intended to illustrate the present invention by way of example only. The preferred embodiments of the present invention may thus vary within the scope of the attached claims.

What is claimed is:

1. A method for processing received signals transmitted via a transmission channel, the method comprising the steps of:

obtaining an estimated channel response function (h+e) of said transmission channel, based on said received signals (y), wherein h is an actual channel response function and e is an error vector attributed to the channel;

further comprising the steps of:

deriving an estimated variance ($\delta^2$) of said received signals (y); and modifying said estimated channel response function (h+e) by applying said estimated variance ($\delta^2$) to said estimated channel response function (h+e), thereby obtaining a modified impulse response ($\underline{h}$); wherein said step of modifying is effected by multiplying said estimated channel response function (h+e) with a vector (a), wherein components of the vector are determined on the basis of parameters of the estimated channel response function (h+e) and said estimated variance ($\delta^2$).

2. A method according to claim 1, further comprising the step of:

applying said modified impulse response ($\underline{h}$) for equalizing said transmitted signals.

3. A method according to claim 1, further comprising the step of:

weighting said estimated variance ($\delta^2$) with a predetermined constant (p).

4. A method according to claim 3, further comprising the step of:

setting said predetermined constant (p) depending on the properties of a used training sequence (TR_SEQ) or a used modulation method.

5. A method according to claim 1, wherein:

the components ($a_i$) of said vector (a) for multiplication are determined according to the following equation:

$$a_i = |h_i|^2 / \{|h_i|^2 + p\delta^2\},$$

wherein "i" denotes an i-th of n vector components and "p" denotes a predetermined constant, with $|h_i|^2$ representing the estimated channel impulse response values based on the respective ($h_i+e_i$) values.

6. A method according to claim 1, wherein the performing of steps is controlled such that the steps are only performed during the period of time of a transmitted burst, which period contains the training sequence.

7. A device (1) for processing received signals transmitted via a transmission channel (4), said device comprising:

obtaining means ($2a$) adapted to obtain an estimated channel response function (h+e) of said transmission channel (4), based on said received signals (y), wherein h is an actual channel response function and e is an error vector attributed to the channel;

deriving means ($2b$) adapted to derive an estimated variance ($\delta^2$) of said received signals (y); and modifying means ($2c$) adapted to modify said estimated channel response function (h+e) by applying said estimated variance ($\delta^2$) to said estimated channel response function (h+e), thereby obtaining a modified impulse response ($\underline{h}$);

said modifying means ($2c$) further comprises a multiplying means adapted to multiply said estimated channel response function (h+e) with a vector (a), wherein components of the vector are determined on the basis of parameters of the estimated channel response function (h+e) and said estimated variance ($\delta^2$).

8. A device according to claim 7, further comprising:

equalizer means (3) for equalizing said transmitted signals and adapted to be supplied with said modified impulse response ($\underline{h}$).

9. A device according to claim 7, further comprising:

weighting means ($2d$) adapted to weight said estimated variance ($\delta^2$) with a predetermined constant (p).

10. A device according to claim 9, further comprising:

setting means ($2e$) for setting said predetermined constant (p) depending on the properties of a used training sequence (TR_SEQ) or a used modulation method.

11. A device according to claim 7, wherein the component ($a_i$) of said vector (a) for multiplication are determined according to the following equation:

$$a_i = |h_i|^2 / \{|h_i|^2 + p\delta^2\},$$

wherein "i" denotes an i-th of n vector components and "p" denotes a predetermined constant, with $|h_i|^2$ representing the estimated channel impulse response values based on the respective ($h_i+e_i$) values.

* * * * *